UNITED STATES PATENT OFFICE.

GEORGE LINDE, OF OMAHA, NEBRASKA.

COMPOSITION FOR REMOVING BOILER INCRUSTATIONS.

SPECIFICATION forming part of Letters Patent No. 605,320, dated June 7, 1898.

Application filed January 8, 1898. Serial No. 666,098. (No specimens.)

*To all whom it may concern:*

Be it known that I, GEORGE LINDE, of Omaha, in the county of Douglas and State of Nebraska, have invented a new and useful Compound for the Removal of Scales and other Matters from Boilers to Thoroughly Clean the Same, of which the following is a full, clear, and exact description.

The compound consists of the following ingredients, combined in about the proportions stated, viz: gallie powder, one-fourth pound; sal-ammoniac, one-fourth pound; soda, fifteen pounds; salt, twenty-one pounds; acetic acid, one and one-fourth pounds; catechu, four ounces; Irish moss, one-half pound.

The ingredients are mixed with one hundred pounds of water and the mass is boiled for several hours. The compound is then ready for use, and after stirring is poured into the water contained in the boiler in quantities according to the size of the boiler and the incrustation therein.

The scales are readily removed from the boiler-shell by the use of the compound, and when the boiler is once clean it needs but a small quantity of my compound from time to time to keep the boiler completely free from scale. The boiler should be blown out once or twice a week when using the compound to remove the loosened scales, which settle in the bottom of the boiler as fine sediment.

Having thus described my invention, I claim as new and desire to secure by Letters Patent—

The herein-described compound, consisting of gallie powder, sal-ammoniac, soda, salt, acetic acid, catechu, and Irish moss, in about the proportions stated.

GEORGE LINDE.

Witnesses:
N. P. FEIL,
FRED MOTTHIES.